E. D. Wilcox,
Grain Cradle.
No. 29346.   Patented July 24, 1860.
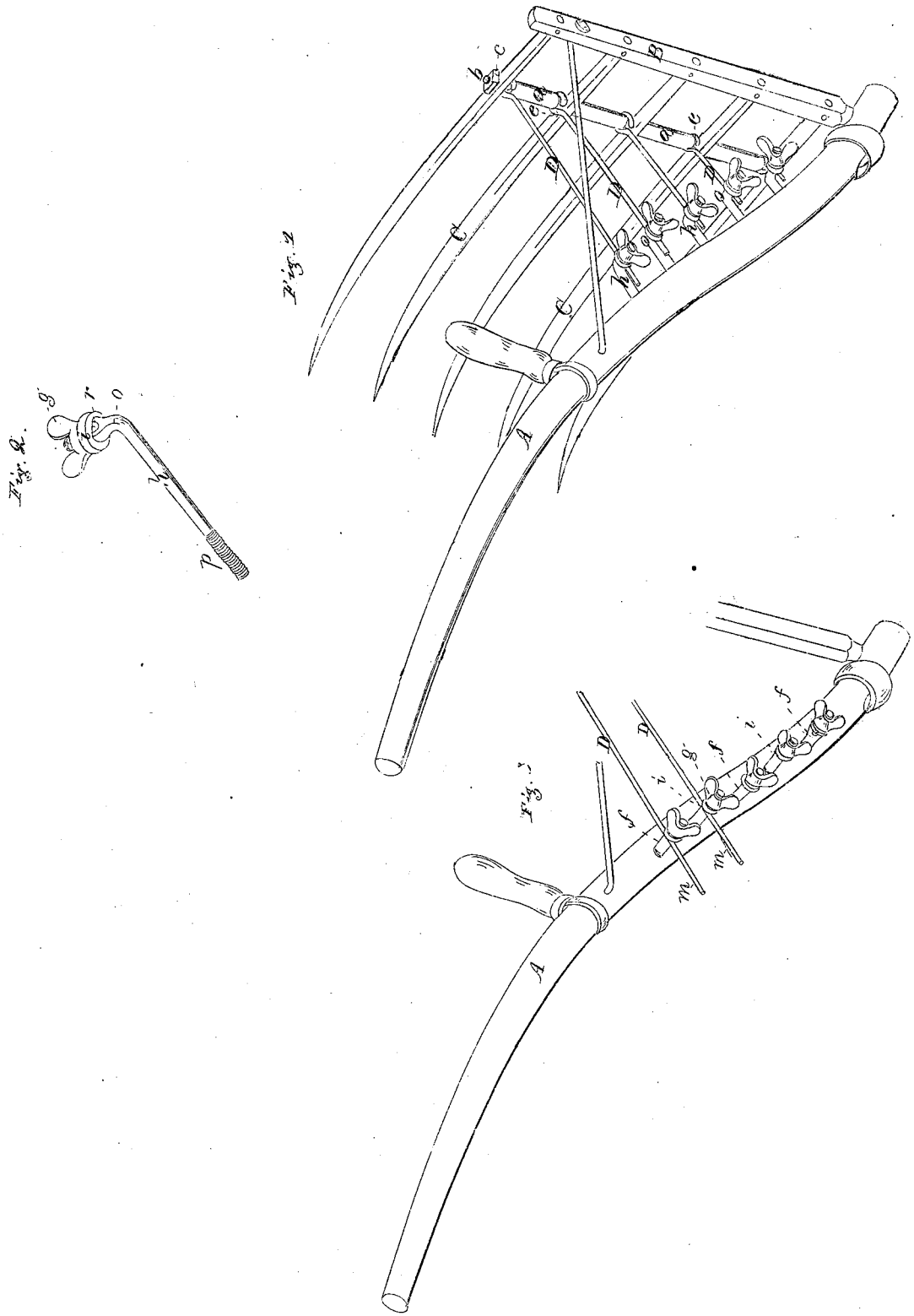

UNITED STATES PATENT OFFICE.

ELIJAH D. WILCOX, OF BELLINGHAM, ASSIGNOR TO HIMSELF AND G. D. NOURSE, OF CAMBRIDGEPORT, MASSACHUSETTS.

IMPROVEMENT IN GRAIN-CRADLES.

Specification forming part of Letters Patent No. 29,346, dated July 24, 1860.

*To all whom it may concern:*

Be it known that I, ELIJAH D. WILCOX, of Bellingham, in the county of Norfolk and State of Massachusetts, have invented certain new and useful Improvements in Grain-Cradles, of which the following is a full, clear, and exact description, reference being had to the accompanying drawings, making part of this specification, in which—

Figure 1 is a view of grain-cradle with my improvements attached; Figs. 2 and 3, details to be referred to hereinafter.

My present invention relates to the adjustment of the fingers of the cradle; and it consists in so connecting the brace-rods, (D of these drawings,) which hold the fingers in their required positions with respect to distance from the snath, with the snath that the ends of these rods may not project beyond the back of the snath and incommode the person using the cradle.

That others skilled in the art may understand and use my invention, I will proceed to describe the manner in which I have carried out the same.

In the said drawings, A is the snath, (the scythe being removed;) B, the head-bar; C, the fingers, which are held at the proper distance from each other by tubes *a*, of wood, and a rod, *b*, which passes through each finger and tube, and is tightened up by a screw-nut; *c*, at one end of it. The distance at which the point of each finger C shall be held from the front side of the snath is regulated by a brace-rod, D, having an eye, *e*, at one end, which embraces the rod *b* near where it passes through the finger. The other end of the rod D is connected with the snath in such a manner that the rod may be moved in or out longitudinally, and then be secured in place. For this purpose (of securing the rod D) the device shown in Fig. 3 has been used. This is a short straight pin, *f*, which is screwed into the top side of the snath A. It has a hole near its outer end, through which the rod D passes. It also has a screw on its end, on which fits a thumb nut, *g*. A loose collar, *i*, embraces the pin below the nut *g*, and is pressed down onto the rod D and holds it secure by turning down the nut *g*. This pin is somewhat flattened out at the point where the hole is made through it. This arrangement answered so far as the adjusting and securing in position of the fingers C; but it will be seen that as the fingers are drawn in toward the snath the ends *m* of the brace-rods D project beyond the rear side of the snath, where they incommode the person using the cradle, and are liable to tear his clothes and bruise his leg. To avoid this I employ the fastening *h*, Fig. 1, (shown detached in Fig. 2,) which is a long pin or rod with its head bent up at right angles at *o*. It has a screw, *p*, at one end, which is screwed into the front side (or that next the fingers) of the snath, as shown in Fig. 1, so that the head through which the rod D passes projects in some distance toward the fingers C. This permits the rods D to be adjusted without their ends projecting beyond or even coming quite out to the snath, while the fastenings themselves are more out of the way than when they occupy the position shown in Fig. 3—on the top side of the snath. The rod D passes through a hole, *r*, Fig. 2, in the head of the rod *h*, and is secured by a collar, *i*, pressed down by a thumb-nut, *g*, in the same manner as before described, and shown in Fig. 3.

What I claim as my invention, and desire to secure by Letters Patent, is—

The bent rod *h*, projecting from the snath toward the fingers C, substantially in the manner and for the purpose specified.

ELIJAH D. WILCOX.

Witnesses:
SMITH BURLINGAME,
HENRY COOK.